United States Patent [19]
Sahm et al.

[11] Patent Number: 5,727,297
[45] Date of Patent: Mar. 17, 1998

[54] TOOL TURRET WITH OFFSET CLUTCH DRIVE

[75] Inventors: Detlef Dieter Sahm, Reichenbach; Kurt Birk, Metzingen, both of Germany

[73] Assignee: Sauter Feinmechanik GmbH., Metzingen, Germany

[21] Appl. No.: 637,240

[22] Filed: Apr. 24, 1996

[30] Foreign Application Priority Data

May 9, 1995 [DE] Germany .................. 195 16 985.9

[51] Int. Cl.⁶ ........................ B23B 39/20; B23Q 5/02
[52] U.S. Cl. ........................................ 29/40; 408/35
[58] Field of Search ..................... 29/39, 40, 41, 29/45, 53, 55; 408/35; 74/813 R, 820; 82/159

[56] References Cited

U.S. PATENT DOCUMENTS

| | | | |
|---|---|---|---|
| 4,051,583 | 10/1977 | Kato et al. | 20/40 |
| 4,847,960 | 7/1989 | Hafla et al. | 29/53 |
| 5,455,993 | 10/1995 | Link et al. | 82/159 X |

FOREIGN PATENT DOCUMENTS

| | | | |
|---|---|---|---|
| 3630966 | 3/1987 | Germany. | |
| 3730561 | 11/1988 | Germany. | |
| 3930121 | 9/1989 | Germany. | |
| 3929803 | 1/1991 | Germany | 29/40 |
| 4125003 | 1/1993 | Germany | 29/40 |
| 2311204 | 12/1990 | Japan | 29/40 |
| 4354604 | 12/1992 | Japan | 29/40 |
| 2275631 | 9/1994 | United Kingdom | 29/40 |

*Primary Examiner*—William R. Briggs
*Attorney, Agent, or Firm*—Roylance, Abrahms, Berdo & Goodman, L.L.P.

[57] ABSTRACT

A tool turret has a housing, a head connected nonrotatably with the housing, and a tool face arranged concentrically to and encompassing the head. The tool face is rotatable around the housing longitudinal axis relative to the housing and head, and is lockable in predetermined angular positions with the housing. A receiving and holding area for a drivable tool is provided in the tool face. A head shaft extends radially in the head relative to its central longitudinal axis. The head shaft can be driven through a miter-wheel gearing and a transmission shaft extending in the rotary axis of the tool face by a motor. A clutch is movable in a longitudinal direction along the head shaft axis relative to the driving shaft of a tool found in the work position, to join the head shaft and the tool shaft. A drive member is arranged in the head spaced in a circumferential direction from the clutch relative to the central longitudinal axis of the head and is connected through a mechanical power transmission arrangement with the clutch. The mechanical power transmission arrangement has an inherently stable power transmission element crossing the central longitudinal axis of the head at some radial distance.

12 Claims, 3 Drawing Sheets

TOOL TURRET WITH OFFSET CLUTCH DRIVE

FIELD OF THE INVENTION

The present invention relates to a tool turret having a housing, a fixed head and rotatable tool face which can be locked in angular positions relative to the housing. A clutch reasonably couples a tool shaft and a head shaft in the head, and is moved by a drive member connected to the clutch through a mechanical transmission assembly.

BACKGROUND OF THE INVENTION

In a known tool turret, the drive shaft of the miter-wheel gearing is mounted rotatably and longitudinally slidably in the head, so that the clutch element can be operated as power transmission element. For that reason the drive shaft must be longitudinally slidable with the driving gear wheel of the miter-wheel gearing. Furthermore, it is necessary that the drive shaft extends into the chamber of the head lying diametrically opposite the clutch element to reach the driving element. No space is present between the driving gear wheel of the miter-wheel gearing and the clutch element to accommodate the driving element. Because of this arrangement, the outlay or cost is still further increased.

A longitudinally slidable shaft of this type cannot be used when the tool turret includes a hollow supporting column arranged concentric to the tool face, connected with the housing of the tool turret, and projecting into the head.

SUMMARY OF THE INVENTION

Objects of the present invention involve providing a tool turret with the hollow supporting column which is simple in construction, and which can operate the clutch when the hollow supporting column projects into the head and when the space between the hollow supporting column and the clutch is insufficient to accommodate a drive element.

The foregoing objects are basically obtained by a tool turret, comprising a housing having a longitudinal axis, a head nonrotatably connected to the housing, and a tool face concentrically encompassing the head and rotatably coupled to the housing and the head for rotation about the longitudinal axis. Locking means are coupled to the tool face and the housing for securing the tool face in predetermined angular positions relative to the housing. At least one holder means in the tool face receives and retains a tool to be driven. A head shaft is rotatably mounted in the head and extends radially relative to the longitudinal axis. The head shaft extends along a shaft axis and has drive means for coupling the head shaft to a drive motor. The drive means includes miter-gearing and a transmission shaft extending along the longitudinal axis. Clutch means releasably couples a tool shaft to the head shaft, and is mounted for axial movement along the shaft axis. A drive member is coupled to the clutch means through a mechanical power transmission assembly. The clutch means and the drive member are spaced in a circumferential direction relative to the longitudinal axis. The mechanical power transmission assembly includes at least a first inherently stable power transmission element crossing the longitudinal axis at a radial distance therefrom.

By virtue of the inherently stable power transmission element crossing the central longitudinal axis of the head at some radial distance therefrom and passing the end of a hollow supporting column projecting into the head, the drive member can be arranged spaced in a circumferential direction relative to the clutch, where sufficient space is usually present to accommodate of the drive member.

In a preferred embodiment, two identically configured power transmission elements are arranged in the head symmetrically relative to the central longitudinal axis of the head. In the vicinity of their two ends the transmission elements are joined with the clutch and the drive member, respectively. The power to be transmitted can then be transmitted free of transverse shearing forces. Transverse shearing forces are held away from both the drive member and the clutch.

The drive member can be an electromagnet (solenoid) or a combination of an electromagnet and a spring. Alternatively, a cylinder/piston assembly can be used advantageously, particularly when the tool turret is attached to a fluid pressure source.

Whether using an electromagnet or a cylinder/piston assembly as drive member, only a longitudinal movement of the anchor or keeper, or of the piston, needs to be transmitted to the clutch. If the power transmission element for this purpose is a movable rod, it can be provided in the head parallel to the thrust direction of the clutch. Preferably, two rods of this sort are arranged symmetrically in relation to the head shaft rotatably mounted in the head and connected through a crossbar or magnet yoke with the drive member at its end further from clutch.

The clutch can be driven by means of the locking member or the operating member thrusting the locking member. The locking and/or operating member can be thrust to slide in the housing of the tool turret longitudinally along the rotary axis of the tool face, in order to lock the tool face in the desired settings form-fitting with the housing of the tool turret, and to free settings temporarily to reach a different setting of the tool face.

When the clutch is driven in this manner, at least one rocking lever is mounted in the head. One arm or end of the rocking lever engages the clutch. The other arm or end of the rocking lever is connected through a mechanism with the locking element or the operating element controlling this locking element.

Preferably, this mechanism has at least one sliding plunger or ramming rod for transmission of the drive force to the rocking lever.

Two identically constructed and symmetrically arranged double-armed rocking levers are provided in a preferred embodiment. The rocking levers transform the movement of the sliding plungers or ramming rods, associated with them, parallel to the rotary axis of the tool face into a radial thrust movement of the clutch.

Regardless of whether the power transmission element is formed by rods or rocking levers which engage the clutch advantageously at some radial distance from the longitudinal axis of the clutch, in a preferred embodiment the clutch has a power introduction element positioned at some radial distance from its longitudinal axis. The power introduction element can be configured as a bell-type distributing gear incorporating the clutch. The annular interface side of the clutch can engage the power transmission element or elements.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

A housing 1 of a tool turret has a longitudinal axis 2 aligned with the longitudinal axis of a cylindrical head 3. The head is attached to one end of a tool face 4 on the housing side, and is in nonrotatable contact or engagement with housing 1. Tool face 4 encompasses head 3 and is mounted rotatably around longitudinal axis 2. Tool face 4 can be locked or fixed with housing 1 in various predetermined angular settings.

Figure 1:
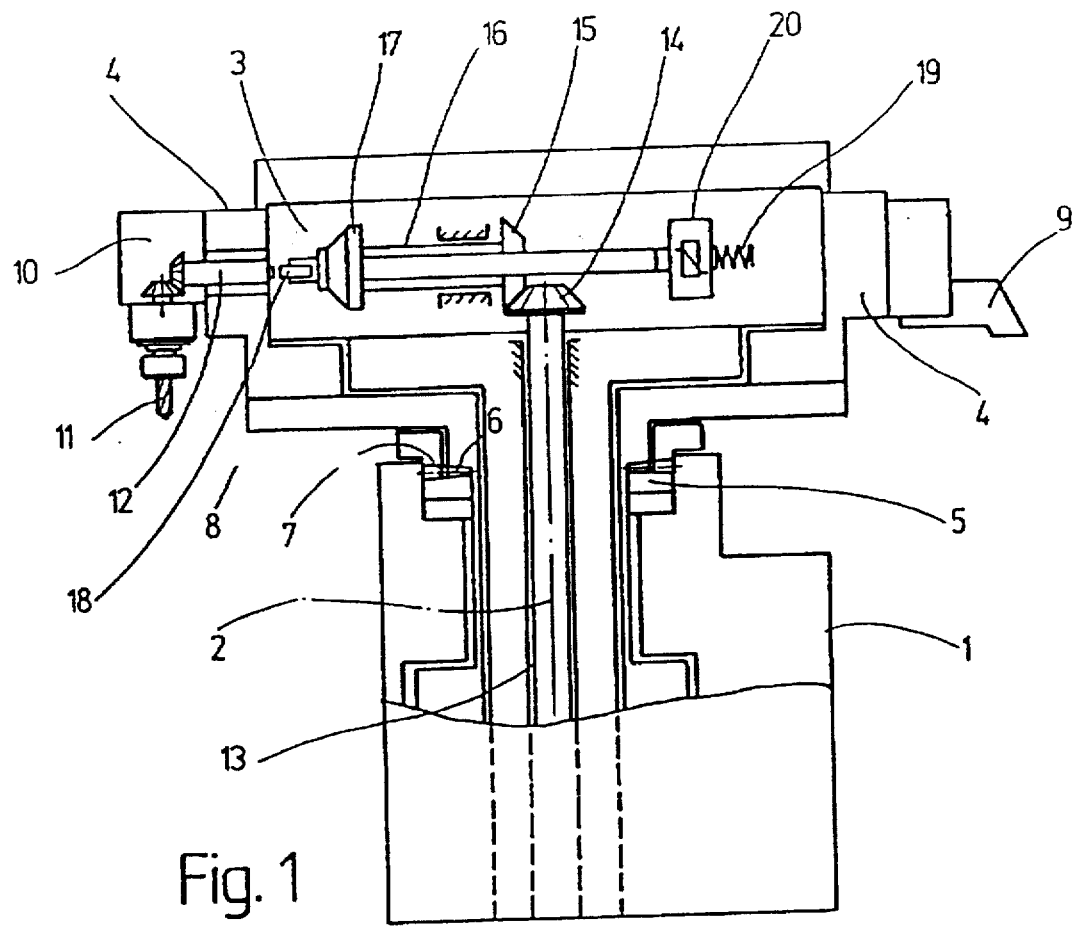
FIG. 1 is a diagrammatic side elevational view partially in section of a tool turret according to a first embodiment of the present invention.

The locking arrangement, shown only in FIG. 1, has an annular locking element 5 which can be thrust in the direction of or along longitudinal axis 2. A toothed interface provided on the interface side of annular element 5 facing head 3 engages in locked settings simultaneously with two concentric interface gear-tooth systems 6 and 7 provided on housing 1 and connected nonrotatably or fixedly with a structural part 8 of tool face 4, respectively.

Tool face 4 comprises a number of receiving and holding arrangements for tools corresponding to the number of its selectable switch settings. For example, a turning tool 9 for a stationary tool is shown in FIG. 1. At least a portion of the tool receivers are configured for receiving and holding drive tools. As an example of a drive tool, a spindle head 10 with a borer or auger 11 is shown in FIG. 1. The driving spindle 12 of spindle head 10 is engaged in the tool receiver. This tool receiver, in its work position, is coupled with a drive motor (not shown).

To drive driving spindle 12, a drive shaft/transmission line 13 is mounted to rotate, while extending along the longitudinal axis 2 of housing 1. One end (not shown) is coupled permanently and fixedly or only during use of spindle head 10 with the drive motor. Drive shaft/transmission line 13 as shown in FIG. 1 extends into head 3. At this end, drive shaft/transmission line 13 supports and is connected securely with a toothed gear wheel 14 of a miter-wheel gearing. The miter-wheel gearing is configured, in the example, as a bevel gear. A second gear wheel 15 mates with gear wheel 14. Gear wheel 15 is mounted securely on one end of a drive shaft 16. Drive shaft 16 is mounted rotatably, extends in a radial direction in head 3 and is axially unslidable or fixed. It is aligned with driving spindle 12 when the tool in spindle head 10 is located in its work position.

A coupling or clutch operating member 17 is arranged on drive shaft 16 and is longitudinally slidable, but nonrotatable, relative to head 3. By means of clutch member 17, a clutch spindle 18 is axially slidable. Spindle 18 is axially aligned with drive shaft 16 and is connected nonrotatably, but is axially slidably with it. This clutch spindle 18 can be joined nonrotatably with drive spindle 12 by an outward thrusting movement radially relative to longitudinal axis 2, and can be drawn back sufficiently that drive spindle 12 is uncoupled and tool face 4 can be pivoted or rotated relative to head 3.

Figure 2:
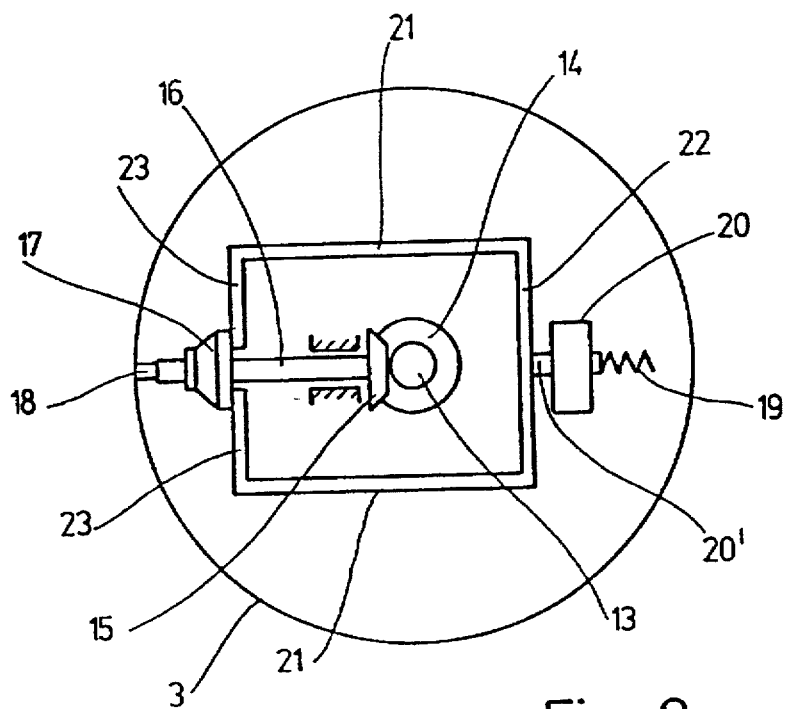
FIG. 2 is a top plan view along the rotary axis of the tool face, viewing the miter-wheel gearing, the power transmission elements encompassing the gearing at some radial distance therefrom, the drive element, and a bell-type distributing gear introducing the driving force into the coupling or clutch of the tool turret of FIG. 1.

Clutch spindle 18 is thrust into a position joined with drive spindle 12 against the force of a pressure spring 19 by a drive member. Graphically illustrated drive member 20 can be an electromagnet 20. As shown in FIGS. 1 and 2, electromagnet 20 is arranged in head 3 in a position diametrically opposite clutch operating member 17. The miter-wheel gearing comprising gear wheels 14 and 15 lies between electromagnet 20 and coupling or clutch operating member 17.

Other than shown in FIGS. 1 and 2, between gear wheels 14 and 15 on one end and the clutch operating member 17 on the other end, there is inadequate space for a drive member for thrusting clutch operating member 17, regardless of whether an electromagnet or a cylinder/piston assembly is used as the drive member. In the part of head 3 diametrically opposite clutch operating member 17 in terms of the gearing, only sufficient space is present to accommodate an electromagnet and, as in the example, a pressure spring 19. Also, there is sufficient space for the drive member 20 to be a cylinder/piston assembly, which can be provided instead of electromagnet 20 and spring 19. Spring 19 can also be arranged between coupling or clutch operating member 17 and clutch spindle 18.

The power transmission from electromagnet 20 and spring 19 to clutch operating member 17, as shown in FIGS. 1 and 2, occurs with the aid of two inherently stable thrust and pull rods 21. One set of ends of rods 21 are connected with clutch operating member 17. The other ends of rods 21 are connected with the anchor or keeper 20' of electromagnet 20. Rods 21 are slidable in a longitudinal direction of drive shaft 16. In the exemplary embodiment, a crossbar or magnet yoke 22 connects the rods 21 with anchor or keeper 20'. For connection with clutch member 17, the end segments 23 of thrust and pull rods 21 aligned counter or opposite to one another.

The two thrust and pull rods 21 facilitate transmission of the operating forces from electromagnet 20 and spring 19 to clutch operating member 17, free of any transverse shearing force. Because of the spacing of thrust and pull rods 21 from the gearing of gear wheels 14 and 15 and drive shaft 16, a hollow column containing drive shaft/transmission line 13 can be arranged axially immovably relative to the housing and within the housing, and can project into head 3. The thrust and pull rods 21 can also encompass such a hollow column.

Figure 3:
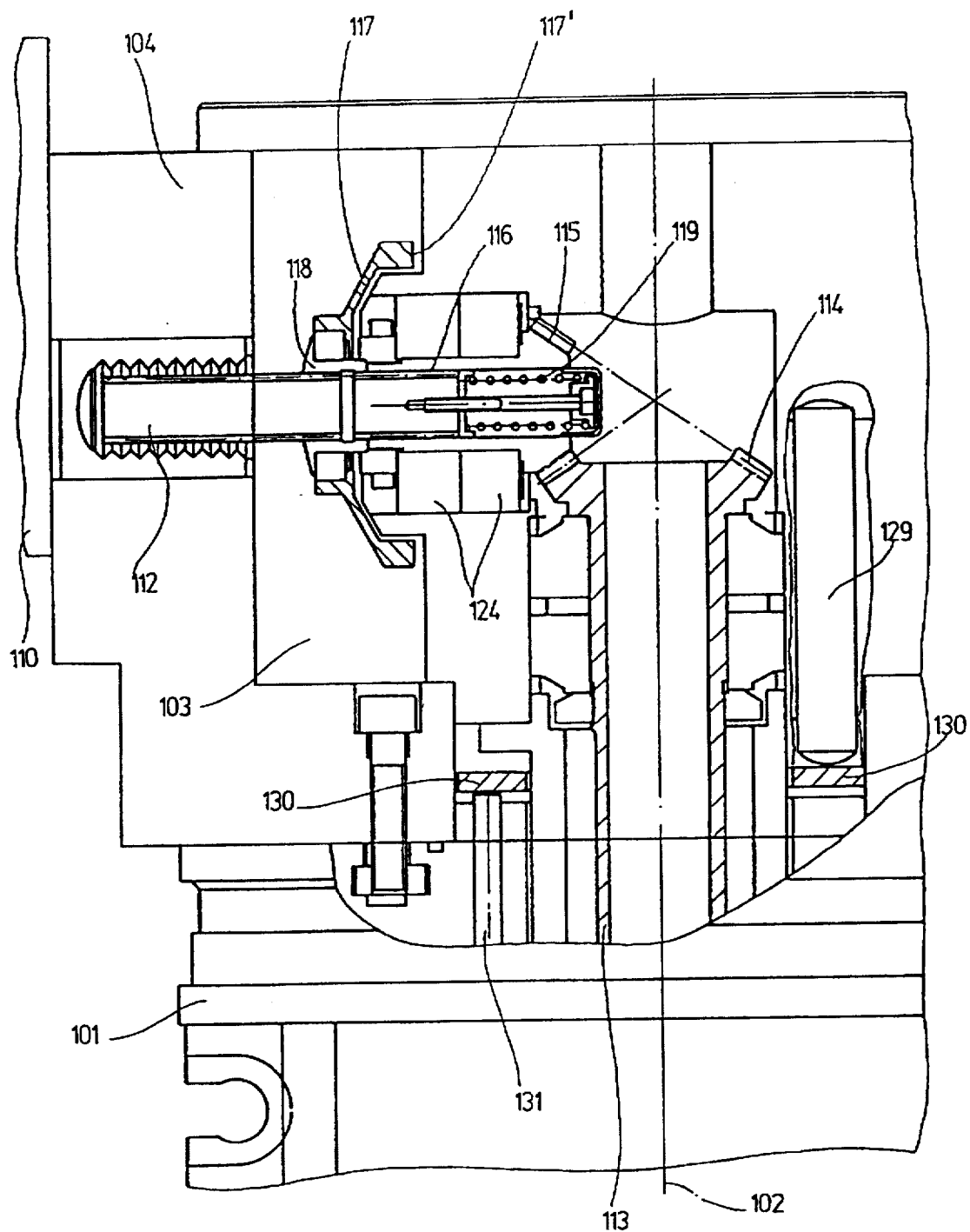
FIG. 3 is a partial, diagrammatic section side elevational view partially in section of a tool turret according to a second embodiment of the present invention.
Figure 4:
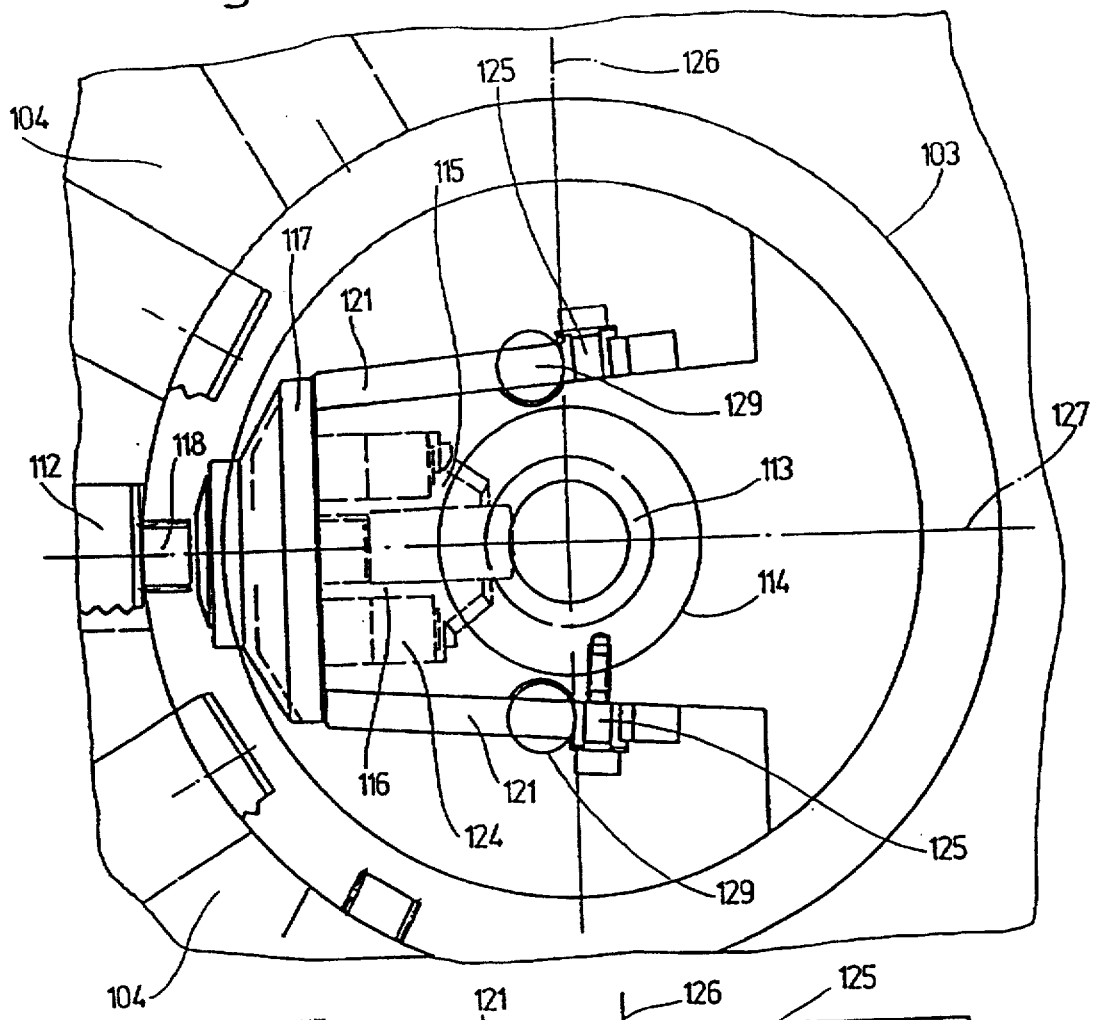
FIG. 4 is a top view of the tool turret of FIG. 3.

The exemplary embodiment represented in FIGS. 3 and 4 differs from that of FIGS. 1 and 2 essentially only by a different drive for the coupling or clutch operating member 117. Corresponding parts are thus indicated with the similar reference numbers, but increased by 100.

As in the embodiment shown in FIGS. 1 and 2, cylindrical head 103 is attached to the only partially illustrated housing 101 and is coaxial with longitudinal axis 102. Head 103 is encompassed by tool face 104 lockable in predetermined angle settings with housing 101.

A drive shaft/transmission line 113 extends along longitudinal axis 102 and projects into head 103. Drive shaft 113 is driven by a motor (not shown), and supports a bevel gear 114 on the end lying in head 103. A second bevel gear 115 mates with gear 114. Bevel gear 115 is connected securely or fixedly with a drive shaft 116. Drive shaft 116 extends radially relative to longitudinal axis 102, and is mounted in head 103 by roller bearings 124. FIG. 3 shows, in detail, that in the area of head 103 carrying roller bearings 124, no space is present for a drive arrangement or means for moving coupling or clutch operating member 117. Such drive arrangement, however, is needed for coupling a clutch shaft 118 with the drive spindle 112 of a tool which is to be driven.

Figure 5:
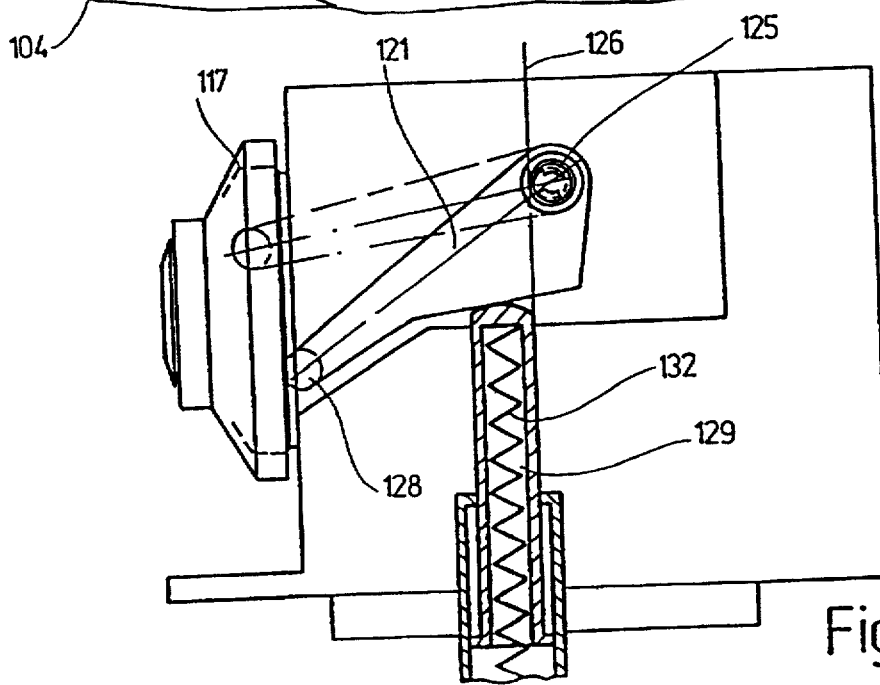
FIG. 5 is a partial side elevational view of the power transmission arrangement of the tool turret of FIG. 3.

The thrusting movement of clutch operating member 117 occurs counter to the force of a pressure spring 119 against driving spindle 112. As shown in FIG. 5, such thrusting movement is generated by two identically configured rocking levers 121. Rocking levers 121 are pivotally mounted adjacent their ends in head 103, each on a supporting trunnion or journal 125. As shown in FIGS. 4 and 5, supporting trunnions or journals 125 are arranged in the vicinity of the longitudinal middle plane 126 of head 103, and on the side of middle plane 126 further away from clutch operating member 117. Supporting journals or trunnions 126 are symmetrical to the plane 127 defined by drive shaft 116 and longitudinal axis 102.

The supporting journals or trunnions are spaced away from plane 127 by a distance sufficiently great that adequate space exists for the miter-wheel gearing and the end of a hollow column containing drive shaft/transmission line 113, also projecting into head 103 between rocking levers 121. As shown in FIG. 5, supporting trunnions or journals 125 are offset from the transverse plane 127 of head 103, incorporating drive shaft 116, and are on a side thereof further away from housing 101. Thus, the two rocking levers 121 extend from supporting trunnions or journals 125 to coupling or clutch operating member 117, and form an acute angle with the thrusting movement direction or axis of clutch operating member 117.

The clutch operating member 117, as shown in FIG. 3, has the shape of a bell. The two rollers 128 are provided at the free ends of the two rocking levers 121, and engage on clutch interface surface 117'. Interface surface 117' is sufficiently extensive that the two rocking levers 121 are guided past roller bearings 124.

In a first position of the two rocking levers 121 illustrated with solid lines in FIG. 5, the thrust direction or axis of the clutch operating member 117 forms an angle of approximately 45 degrees with the rocking levers. The rocking levers can pivot to a second position illustrated with broken lines to form an angle of only approximately 10 degrees with the thrust direction or axis of clutch operating member 117. In the second position of the rocking levers, coupling or clutch operating member 117 is thrust in a direction away from longitudinal axis 102, toward drive spindle 112 of the tool to be driven by means of drive shaft 116. Thus, clutch shaft 118 is coupled nonrotatably with drive spindle 112.

The two rocking levers 121 are pivoted in clockwise direction, as viewed in FIG. 5, by means of a plunger or ramming rod 129 for each lever. Each plunger is mounted to slide longitudinally in a direction parallel to longitudinal axis 102 in head 103. One end of each plunger engages the respective rocking lever 121 at some distance from bearing journal 125. In FIG. 3, one of the two plungers or ramming rods 129 is illustrated for simplicity in an angularly offset position. The actual position of the two plungers or ramming rods 129 is shown in FIGS. 4 and 5.

To limit the operating forces, plungers or ramming rods 129 are configured telescopically in two parts, the two parts are biased by a pressure spring 132. Plungers or ramming rods 129 are arranged parallel to longitudinal middle plane 126, and are symmetrical relative to plane 127. The end of each plunger or rod remote from rocking lever 121 engages on a ring 130 arranged concentric to longitudinal axis 102. Ring 130 is mounted in head 103, and can slide in the direction of or along longitudinal axis 102, as shown in FIG. 3. Ring 130 is supported by three identically configured bolts 131 offset from one another by 120 degrees and arranged at identical distances from longitudinal axis 102. The bolts are connected and supported in the exemplary embodiment with locking member or annular element 5 which is movable along longitudinal axis 2.

Following a pivotal movement of tool face 104, the tool face is again locked with housing 101 by means of the locking member. Bolts 131, ring 130 and plungers 129 are then thrust against the interface side of head 103 further away from housing 101. The result of this thrusting motion is that the two rocking levers 121 are pivoted in clockwise direction as viewed in FIG. 5, such that clutch shaft 118 is joined with spindle 112. In this position, the gearteeth of clutch shaft 118 engage the gearteeth of driving spindle 112. Insufficient thrusting motion of clutch operating member 117 is detectable by a sensor, if the gearteeth of clutch shaft 118 are aligned with the gearteeth of driving spindle 112. The locking member is then moved back into its unlocking and release setting and clutch shaft 118 is rotated even insignificantly by rotation of drive shaft/transmission line 113. Then the locking of tool face 104 is repeated and coupling of clutch shaft 118 with spindle 112 is tried again. If the second time a coupling should not be possible, the same process is repeated. In the same manner, even with the embodiment as in FIGS. 1 and 2, a coupling of clutch shaft 18 with driving spindle 12 is effected, if initially the gearteeth of clutch shaft 18 should come in contact with the gearteeth of driving spindle 12.

While various embodiments have been chosen to illustrate the invention, it will be understood by those skilled in the art that various changes and modifications can be made therein without departing from the scope of the invention as defined in the appended claims.

What is claimed is:

1. A tool turret, comprising:

a housing having a longitudinal axis;

a head nonrotatably connected to said housing;

a tool face concentrically encompassing said head and rotatably coupled to said housing and said head for rotation about said longitudinal axis;

locking means, coupled to said tool face and said housing, for securing said tool face in predetermined angular positions relative to said housing;

at least one holder means, in said tool face, for receiving and retaining a tool to be driven;

a head shaft rotatably mounted in said head and extending radially relative to said longitudinal axis, said head shaft extending along a head shaft axis and having drive means for coupling said head shaft to a drive motor, said drive means including miter-gearing and a transmission shaft extending along said longitudinal axis;

clutch means for releasably coupling a tool shaft to said head shaft, said clutch means being mounted for axial movement along said head shaft axis; and a drive member coupled to said clutch means through a mechanical power transmission assembly, said clutch means and said drive member being spaced in a circumferential direction relative to said longitudinal axis, said mechanical power transmission assembly including at least a first inherently stable power transmission element crossing said longitudinal axis at a radial distance therefrom.

2. A tool turret according to claim 1 wherein said mechanical power transmission assembly comprises a second inherently stable power transmission element, said first and second transmission elements being substantially identical and being arranged symmetrically relative to said head shaft axis and relative to said longitudinal axis, said transmission elements being joined adjacent ends thereof with said clutch means and said drive member.

3. A tool turret according to claim 1 wherein said drive member comprises an electromagnet.

4. A tool turret according to claim 1 wherein said drive member comprises a piston and cylinder assembly.

5. A tool turret according to claim 2 wherein each of said transmission elements comprises a movable rod mounted for movement in said head in a direction parallel to said head shaft axis.

6. A tool turret according to claim 5 wherein said rods are arranged symmetrically relative to said head shaft, and comprise ends remote from said clutch means connected by a crossbar to said drive member.

7. A tool turret according to claim 1 wherein said transmission element comprises a first rocking lever mounted in said head, one end of said rocking lever engaging said clutch means, and another end of said rocking lever being joined to a structural part of said locking means.

8. A tool turret according to claim 7 wherein an operating means, coupled to said rocking lever, comprises a plunger.

9. A tool turret according to claim 7 wherein said transmission element comprises a second rocking lever, said first and second rocking levers being substantially identical; and first and second substantially identical plungers engage and transmit forces to move said rocking levers in response to movement of said structural part of said locking means.

10. A tool turret according to claim 1 wherein said clutch means comprises an operating member engaging said transmission element.

11. A tool turret according to claim 10 wherein said operating member comprises a bell-shaped distributing gear having an annular interface side engaging said transmission element.

12. A tool turret according to claim 8 wherein said plunger comprises means for limiting operating forces on said rocking lever.

* * * * *